(12) United States Patent
Wang et al.

(10) Patent No.: US 7,551,014 B1
(45) Date of Patent: Jun. 23, 2009

(54) DIFFERENTIAL OUTPUT WITH LOW OUTPUT SKEW

(75) Inventors: Bonnie I. Wang, Cupertino, CA (US); Chiakang Sung, Milpitas, CA (US); Khai Nguyen, San Jose, CA (US); Xiaobao Wang, Cupertino, CA (US)

(73) Assignee: Altera Corporation, San Jose, CA (US)

(*) Notice: Subject to any disclaimer, the term of this patent is extended or adjusted under 35 U.S.C. 154(b) by 0 days.

(21) Appl. No.: 11/670,109

(22) Filed: Feb. 1, 2007

(51) Int. Cl.
*G06F 7/44* (2006.01)
(52) U.S. Cl. .................. 327/256; 327/257; 327/258; 327/171; 326/38
(58) Field of Classification Search .............. 326/82, 326/86, 26, 27, 36; 327/278, 258, 262
See application file for complete search history.

(56) References Cited

U.S. PATENT DOCUMENTS

| | | | | |
|---|---|---|---|---|
| 6,353,334 B1 * | 3/2002 | Schultz et al. | ................ | 326/82 |
| 6,366,148 B1 * | 4/2002 | Kim | .......................... | 327/262 |
| 6,642,760 B1 * | 11/2003 | Alon et al. | ................... | 327/158 |
| 6,664,835 B1 * | 12/2003 | Chen | .......................... | 327/258 |
| 6,891,394 B1 * | 5/2005 | Yu et al. | ....................... | 326/38 |
| 7,030,673 B2 * | 4/2006 | Song | .......................... | 327/258 |

\* cited by examiner

*Primary Examiner*—Vibol Tan
(74) *Attorney, Agent, or Firm*—Townsend and Townsend and Crew LLP; David B. Raczkowski

(57) ABSTRACT

Circuits and methods provide single-ended and differential signals. Single-ended drivers are used to, e.g., reduce pin capacitance. The output cell uses an inversion circuit, such as a phase splitter, to derive the differential signals from the same output signal and provide low skew between the differential signals at the output pins. Selection circuits are used to select between single-ended and differential output.

18 Claims, 8 Drawing Sheets

DIFFERENTIAL OUTPUT WITH LOW OUTPUT SKEW

BACKGROUND

The present invention related generally to differential output and more particularly to providing differential output signals with low skew using single-ended drivers.

With the increasing speed of memory devices, many memory interface protocols adopted differential input/output standards, such as differential SSTL and HSTL, for the data strobe signals. Differential signaling is a method of transmitting information over pairs of wires as opposed to single-ended signaling, which transmits information over single wires. Differential signaling reduces the noise on a connection by rejecting common-mode interference.

In differential signaling, two wires are routed in parallel, and sometimes twisted together, so that they will receive the same interference. One wire carries the signal, and the other wire carries the inverse of the signal, so that the sum of the voltages on the two wires is always constant. Examples include Firewire, SSTL, HSTL, and Serial ATA. A drawback of differential signaling is that it requires two wires for every signal, which has consequences for circuitry involved in outputting the signal.

Output cells typically use a differential driver to provide such differential signals. However, for programmable logic devices (PLD) both single-ended and differential output may be desired. Providing such programmable output capabilities can cause high capacitance on the output pins and/or large skew between the two signals during a differential output.

It is therefore desirable to provide circuits and methods that can output single-ended and differential signals with low pin capacitance, while having a low skew between the differential signals.

BRIEF SUMMARY

Embodiments of the present invention may be used to improve integrated circuits that provide differential output. In one aspect, embodiments provide output cells that have differential and single-ended output capabilities while having low pin capacitance and low skew between differential signals.

According to one exemplary embodiment, an integrated circuit has an output cell. The output cell includes a first selection circuit with a first input coupled with a first data line and an output coupled with a first single-ended driver. Similarly, a second selection circuit has a first input coupled with a second data line and an output coupled with an input of the second single-ended driver. A phase splitter receives an input from one of the data lines and provides an output to each of the selection circuits, where the outputs are inverses of each other. For example, a first output signal of the phase splitter is an inverse of a second output signal, or a second output signal may be the inverse. A first single-ended driver receives a signal from the first selection circuit and provides an output signal to a first output pin. A second single-ended driver receives a signal from the second selection circuit and provides an output signal to a second output pin.

In one embodiment having an output timing cell, the outputs of respective timing devices are coupled with the first inputs of the respective selection circuits. Each timing device may have a respective input data line that is coupled with a selection circuit, which also receives an input from the timing device. There also may be other logic elements between the output timing cell and the output cell.

In one embodiment, a single-ended output may be provided using the second data line. In another embodiment, the first selection circuit is directly connected to the first single-ended driver, and the second selection circuit is directly connected to the second single-ended driver. In yet another embodiment, the phase splitter prevents a first signal at its first output from completing a transition from a low voltage to a high voltage before a second signal at its second output starts a transition from a high voltage to a low voltage.

According to another exemplary embodiment, a first timing device receives a first data signal at a first timing device. The first timing device outputs a second data signal to an output cell based on a clock signal. The second data signal is inverted to provide a third data signal. The third data signal is transmitted to a first selection circuit. In one embodiment, the first timing device is be a register.

A first single-ended driver, which is coupled with a first output pin, receives a signal that is based on the second data signal and that is an inverse of the third data signal. The first selection circuit selects the third data signal to transmit to a second single-ended driver that is coupled with a second output pin. The first selection circuit may be directly connected to the first single-ended driver. In one embodiment, the signal based on the second data signal is the second data signal.

In one embodiment, the inverting of the second data signal uses a phase splitter that receives the second data signal and outputs a fourth data signal to a second selection circuit. The second selection circuit selects the fourth data signal to provide the signal based on the second data signal that is received at the first single-ended driver. In one aspect, the third data signal is prevented from completing a transition from a low voltage to a high voltage before the fourth data signal starts a transition from a high voltage to a low voltage.

According to another exemplary embodiment, an integrated circuit has an output cell including a first output pin coupled with an output of a first single-ended driver, and a second output pin coupled with an output of a second single-ended driver. A first selection circuit receives a first input on a first data line and outputs a signal to the first single-ended driver. A second data line is coupled with a second single-ended driver. An inversion circuit receives an input from the second data line and outputs an inverted signal to a second input of the first selection circuit. In one embodiment, the first selection circuit is a multiplexer. The first data line may be used for a single-ended output.

In one embodiment, the first and second data lines are each coupled with an output of a respective output register. In another embodiment, the first selection circuit is directly connected to the first single-ended driver. In an embodiment where the inversion circuit is a phase splitter, the output cell also includes a second selection circuit that has an input from the second data line and an output to the second single-ended driver. In one embodiment, the phase splitter has a non-inverted output coupled with a second input of the second selection circuit.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

DETAILED DESCRIPTION OF EXEMPLARY EMBODIMENTS

Embodiments of the present invention may be used to improve circuits that provide differential output. With embodiments of the present invention, an integrated circuit can be configured to provide differential and single-ended output capabilities while having low pin capacitance and low skew between differential signals. Embodiments may be useful for any integrated circuit that desires to provide such dual output capabilities.

Figure 1:
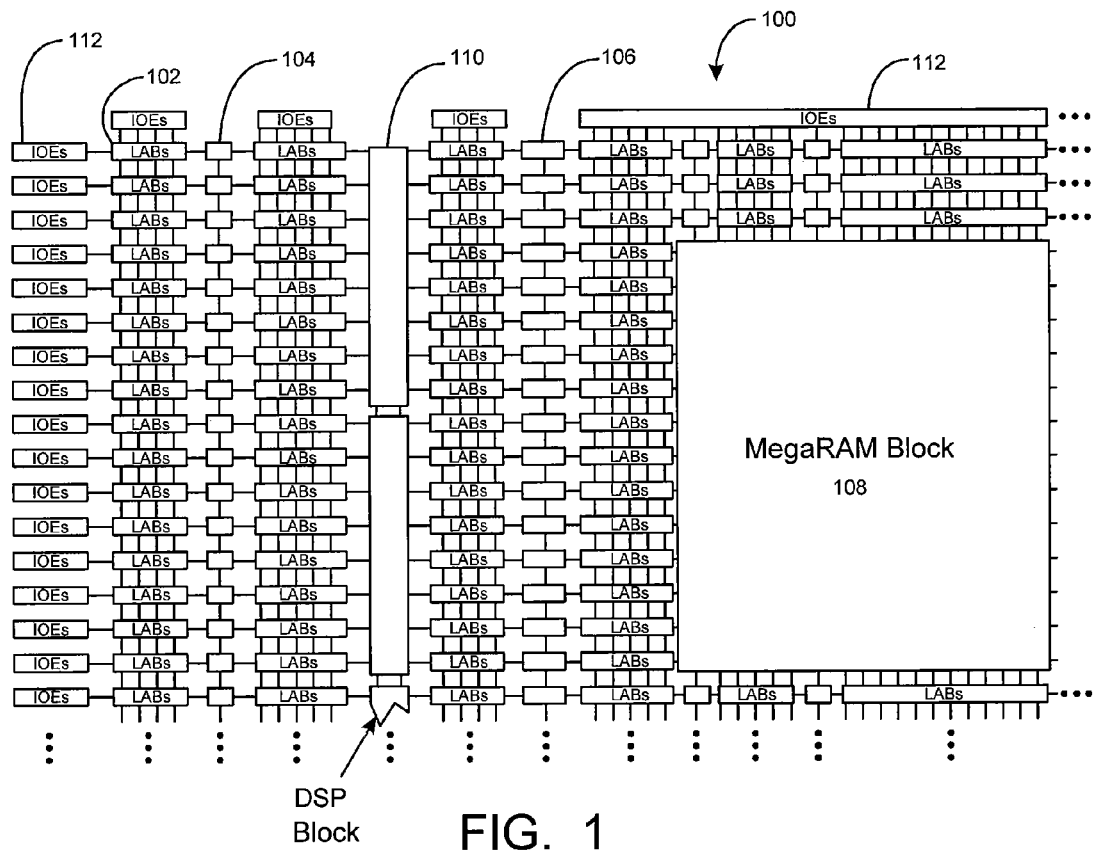
FIG. 1 illustrates a simplified block diagram of a programmable logic device that does benefit by incorporating embodiments of the present invention.

FIG. 1 is a simplified partial block diagram of an exemplary high-density programmable logic device (PLD) 100 wherein techniques according to the present invention can be utilized. PLD 100 includes a two-dimensional array of programmable logic array blocks (or LABs) 102 that are interconnected by a network of column and row interconnections of varying length and speed. LABs 102 include multiple (e.g., 10) logic elements (or LEs), an LE being a small unit of logic that provides for efficient implementation of user defined logic functions.

PLD 100 also includes a distributed memory structure including RAM blocks of varying sizes provided throughout the array. The RAM blocks include, for example, 512 bit blocks 104, 4K blocks 106 and an M-Block 108 providing 512K bits of RAM. These memory blocks may also include shift registers and FIFO buffers. PLD 100 further includes digital signal processing (DSP) blocks 10 that can implement, for example, multipliers with add or subtract features.

PLD 100 also includes input/output elements (IOEs) 112 for providing a communication interface with circuits and devices that are external to PLD 100. These other circuits or devices may reside on another circuit board, a same circuit board, or even the same chip. It is to be understood that PLD 100 is described herein for illustrative purposes only and that the present invention can be implemented in many different types of PLDs, FPGAs, and the other types of digital integrated circuits.

Figure 2:
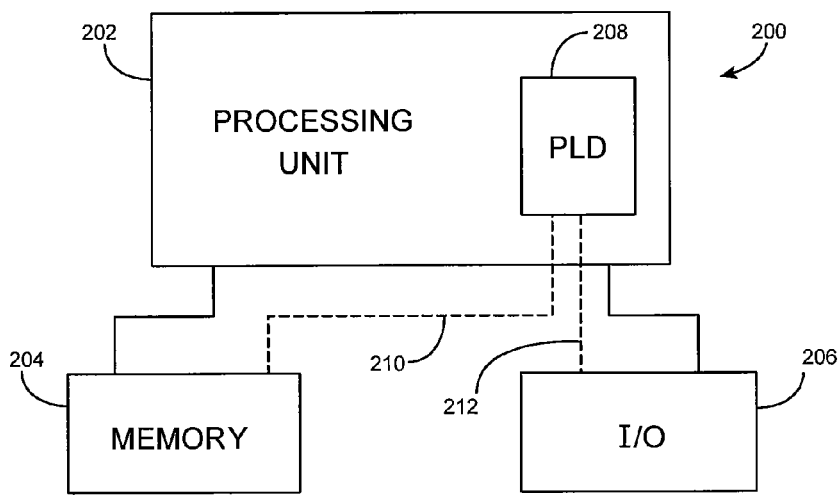
FIG. 2 illustrates a block diagram of an electronic system that does benefit by incorporating embodiments of the present invention.

While PLDs of the type shown in FIG. 1 provide many of the resources required to implement system level solutions, the present invention can also benefit systems wherein a PLD is one of several components. FIG. 2 shows a block diagram of an exemplary digital system 200, within which the present invention may be embodied. System 200 can be a programmed digital computer system, digital signal processing system, specialized digital switching network, or other processing system. Moreover, such systems may be designed for a wide variety of applications such as telecommunications systems, automotive systems, control systems, consumer electronics, personal computers, electronic displays, Internet communications and networking, and others. Further, system 200 may be provided on a single board, on multiple boards, or within multiple enclosures.

System 200 includes a processing unit 202, a memory unit 204 and an I/O unit 206 interconnected together by one or more buses. According to this exemplary embodiment, a programmable logic device (PLD) 208 is embedded in processing unit 202. PLD 208 may serve many different purposes within the system in FIG. 2. PLD 208 can, for example, be a logical building block of processing unit 202, supporting its internal and external operations. PLD 208 is programmed to implement the logical functions necessary to carry on its particular role in system operation. PLD 208 may be specially coupled to memory 204 through connection 210 and to I/O unit 206 through connection 212.

Processing unit 202 may direct data to an appropriate system component for processing or storage, execute a program stored in memory 204 or receive and transmit data via I/O unit 206, or other similar function. Processing unit 202 can be a central processing unit (CPU), microprocessor, floating point coprocessor, graphics coprocessor, hardware controller, microcontroller, programmable logic device programmed for use as a controller, network controller, and the like. Furthermore, in many embodiments, there is often no need for a CPU.

For example, instead of a CPU, one or more PLD 208 can control the logical operations of the system. In an embodiment, PLD 208 acts as a reconfigurable processor, which can be reprogrammed as needed to handle a particular computing task. Alternately, programmable logic device 208 may itself include an embedded microprocessor. Memory unit 204 may be a random access memory (RAM), read only memory (ROM), fixed or flexible disk media, PC Card flash disk memory, tape, or any other storage means, or any combination of these storage means.

Referring back to FIG. 1, IO elements 112 may be used to provide different types and standards of output signals, including different types of single-ended signaling or differential signaling. Single-ended signaling is the simplest method of transmitting electrical signals over wires. One wire carries a varying voltage that represents the signal, while the other wire is connected to a reference voltage, usually ground. Examples include RS-232, TTL, PS/2, and ATA. An alternative to single-ended signaling is called differential signaling.

Differential signaling transmits information over pairs of wires. Differential signaling reduces the noise on a connection by rejecting common-mode interference. Two wires are routed in parallel, and sometimes twisted together, so that they will receive the same interference. One wire carries the signal, and the other wire carries the inverse of the signal, so that the sum of the voltages on the two wires is always constant. Examples include Firewire, SSTL, HSTL, and Serial ATA. A drawback of differential signaling is that it requires two wires for every signal, which has consequences for circuitry involved in outputting the signal.

Figure 3:
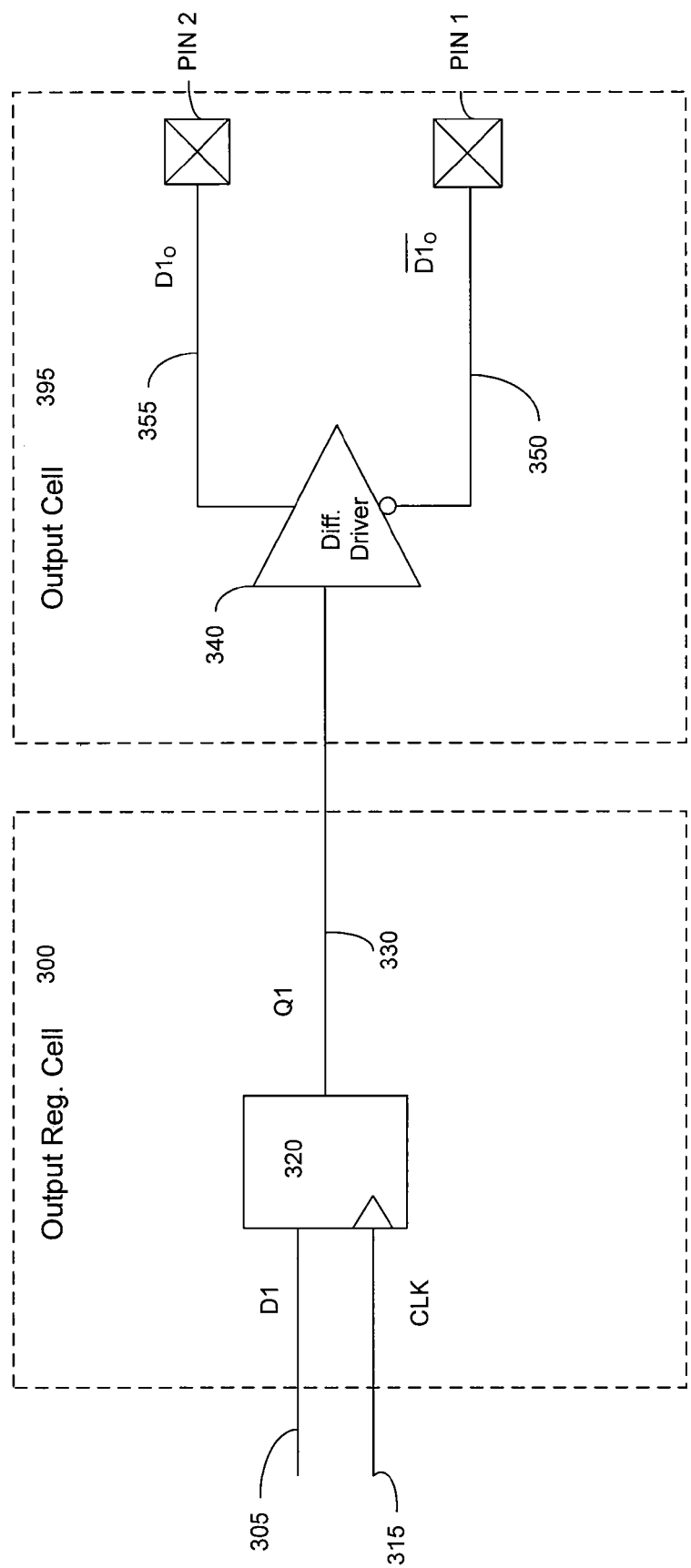
FIG. 3 is a schematic of output circuitry that is used to output a differential signal and that does benefit by incorporating embodiments of the present invention.

FIG. 3 is a schematic of output circuitry that is used to output a differential signal and that is improved by incorporating an embodiment of the present invention. This schematic includes an output register cell 300 that receives a data signal D1 on line 305. D1 may be timed by register 320 though a clock signal CLK on line 315. As determined by the CLK signal, register 320 outputs Q1 on line 330. Q1 is then input into a differential driver 340, which provides an output signal $D1_O$ on line 355 and the inverse of $D1_O$, signified as output signal $\overline{D1_O}$, on line 350. $D1_O$ is then output from pin 2, and $\overline{D1_O}$ is output from pin 1.

In a programmable logic device, such as PLD 100, it is advantageous to have an output cell to be configurable for single-ended output and/or differential output. Single-ended output may be provided with single-ended drivers. However, if additional single-ended drivers are added to output cell 395, along with differential driver 340, there is an increased pin capacitance between pin 1 and pin 2. Thus, embodiments of the present invention utilize two single-ended drivers for both single-ended output and differential output.

Figure 4:
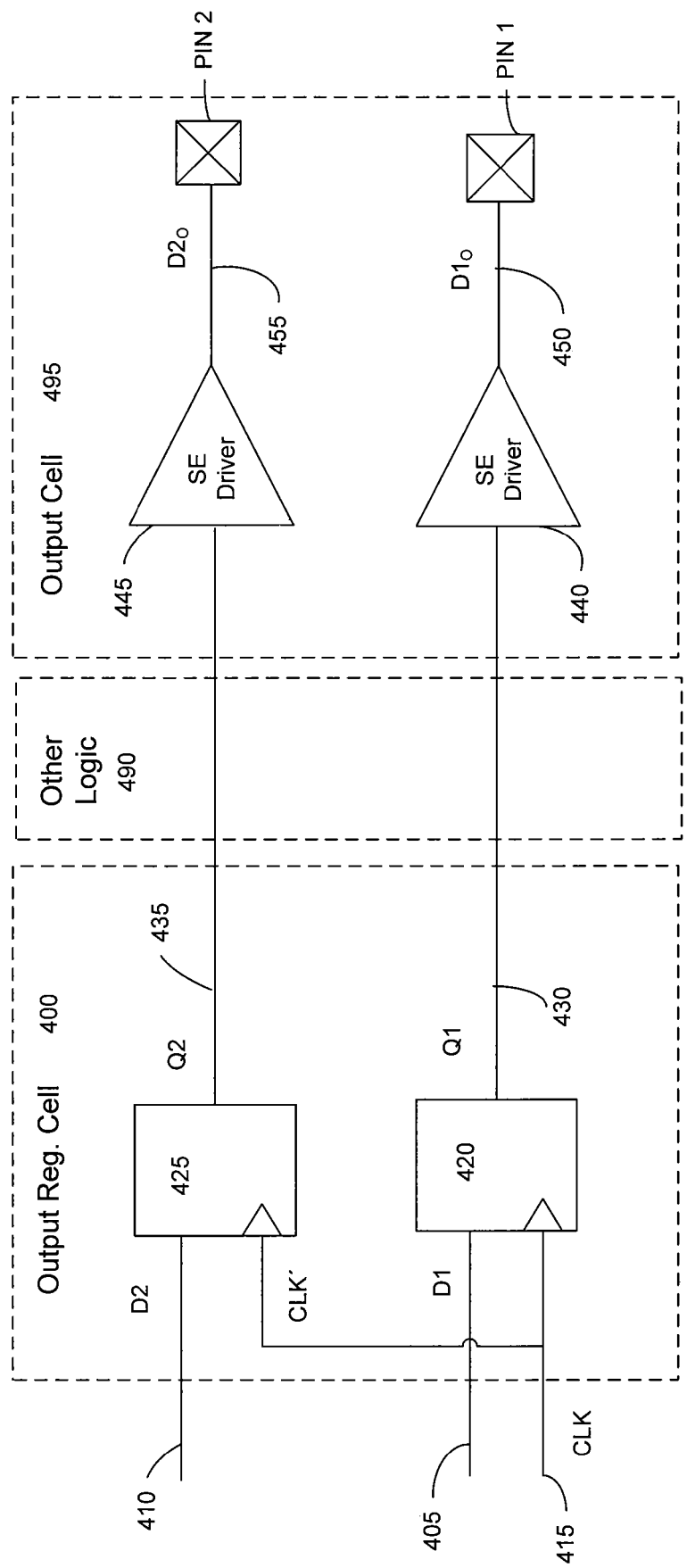
FIG. 4 is a schematic of output circuitry used to output single-ended or differential signals and that is improved by incorporating an embodiment of the present invention.

FIG. 4. is a schematic of output circuitry used to output single-ended signals or differential signals and that is improved by incorporating an embodiment of the present invention. This schematic includes an output register cell 400 that receives a data signal D1 on line 405. D1 may be timed by register 420 though a clock signal CLK on line 415. A data signal D2 is received by register 425 on line 410. When a PLD is configured to provide a differential output from an output cell 495, D1 and D2 are the inverse of each other. When the PLD is configured to provide two single-ended outputs from output cell 495, D1 and D2 are independent of each other.

In a differential output mode, both D1 and D2 are timed by the clock signal CLK and CLK' with CLK' branching off from CLK. As determined by the clock signals, registers 420 and 425 respectively produce Q1 on line 430 and Q2 on line 435. Both signals Q1 and Q2 may travel through other logic 490 on their way to output cell 495. Q1 is received at single-ended (SE) driver 440, which provides an output $D1_O$; and Q2 is received at SE driver 445, which provides an output $D2_O$. $D1_O$ is then output from pin 1, and $D2_O$ is output from pin 2.

Figure 5A:
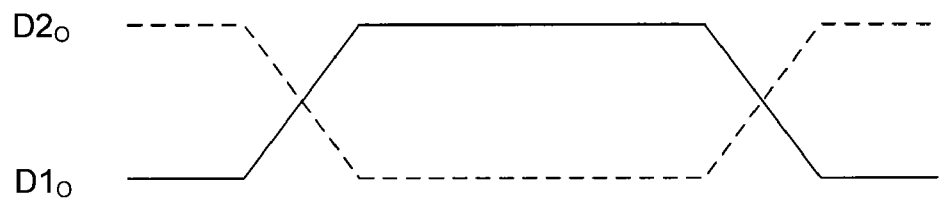
FIG. 5A is a timing diagram of two signals that form a differential output and that are identical inverses of each other.

During a differential output, ideally $D1_O$ and $D2_O$ are the exact inverse of each other so as to switch at the same time and have no timing skew or mismatch. In that manner, the average voltage is always the same, thus reducing common-mode interference. For example, FIG. 5A is a timing diagram of two signals $D1_O$ and $D2_O$ that form a differential output and that are identical inverses of each other. As shown, $D1_O$ and $D2_O$ are inverses of each other. $D1_O$ starts rising at the same point and rate as $D2_O$ falls. Thus, the average voltage of $D1_O$ and $D2_O$ is always the same.

Figure 5B:
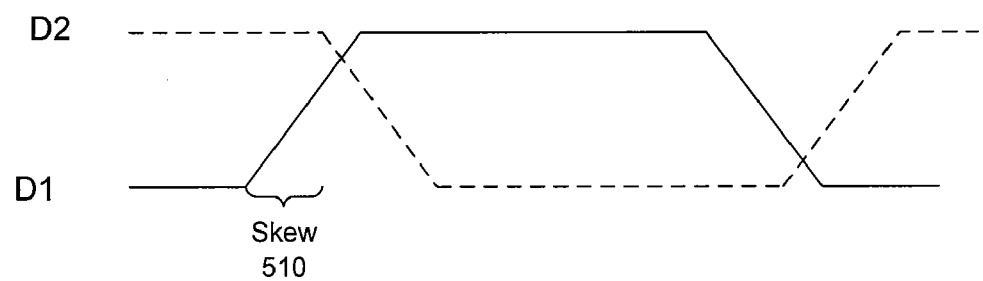
FIG. 5B is a timing diagram of two data signals used in a differential output that show skew.

However, due to different routing paths, $D1_O$ and $D2_O$ can have a skew between them. The skew may come from several sources. One source may be the different routing paths that D1 and D2 take to the respective registers 420 and 425. FIG. 5B is a timing diagram of two data signals D1 and D2 used in a differential output that show skew. The signals D1 and D2 are not perfect inverses of each other, as exhibited by skew 510. Registers 420 and 425 using the CLK signal may be used to at least partially correct for this timing skew.

Figure 5C:
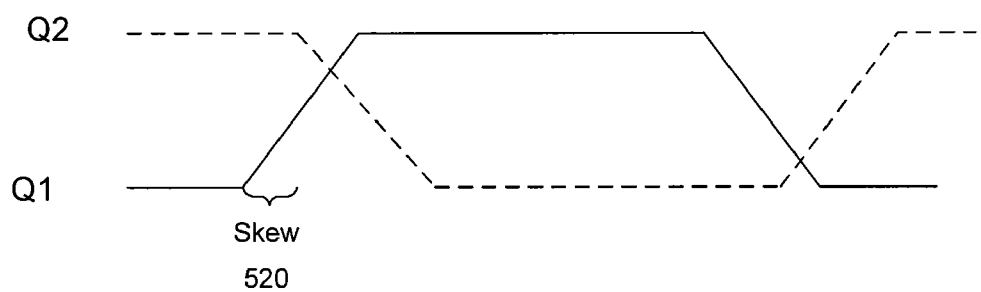
FIG. 5C is a timing diagram of register output signals used in a differential output that show skew.

Unfortunately, the respective clock signals CLK, CLK' routed to the register 420 and 425 take different paths, which can create skew between Q1 and Q2 as each register is clocked at different times according to the delay difference between CLK and CLK'. FIG. 5C is a timing diagram of these register output signals used in a differential output that show skew. The signals Q1 and Q2 are not perfect inverses of each other, as exhibited by skew 520. The lag time of Q2 is at least due to the extra distance that the CLK' signal takes en route to register 425.

Figure 5D:
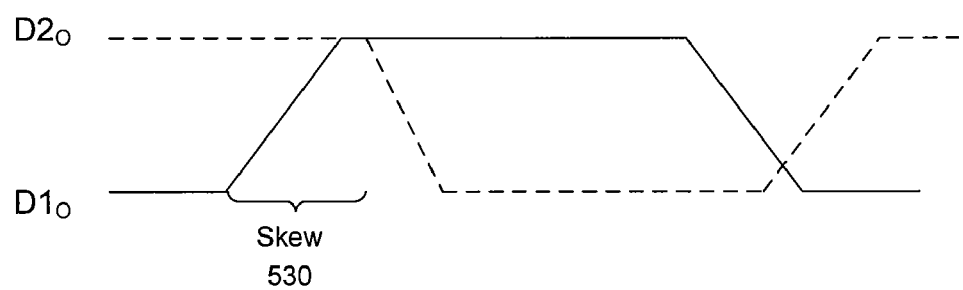
FIG. 5D is a timing diagram of two signals that form a differential output that show skew.

Additional skew may result from different paths that Q1 and Q2 takes through other logic 490 en route to output cell 495. FIG. 5D is a timing diagram of two signals $D1_O$ and $D2_O$ that form a differential output that show skew. The exhibited skew 530 could be larger or smaller than the skew 520 created from the different clock paths, depending on the difference in delay through other logic 490. Often, the amount of skew 530 is greater than the tolerance as specified in differential I/O standards, which can require skew of less than 100 picoseconds. Accordingly, embodiments of the present invention reduce skew.

Figure 6:
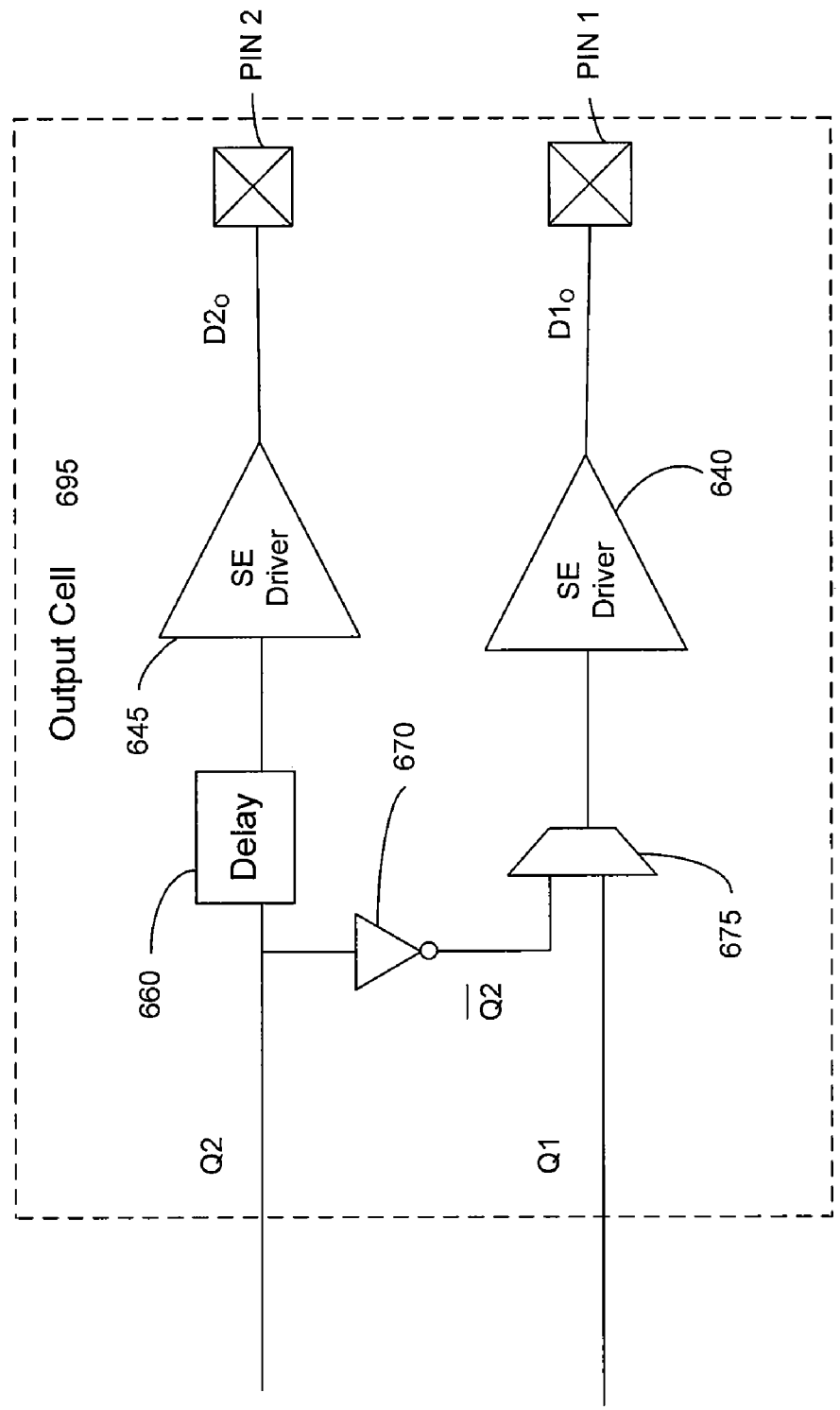
FIG. 6 is a schematic of an output cell used to output single-ended signals or differential signals according to an embodiment of the present invention.

FIG. 6 is a schematic of an output cell 695 used to output single-ended signal or a differential signal according to an embodiment of the present invention. Output cell 695 could be part of a larger input/output cell or as a separate circuit from an input cell. In a differential output mode, the data signal Q2 is inverted by inverter 670 to produce $\overline{Q2}$. A multiplexer 675 receives $\overline{Q2}$. During a differential output, multiplexer 675 is set to select $\overline{Q2}$ for output to SE driver 640, which sends an output $D1_O$ to pin 1.

SE driver 645 receives Q2 and produces $D2_O$ for output on PIN 2. The amount of delay in $\overline{Q2}$ created by inverter 670 and multiplexer 675 may be sufficiently small such that the skew between $D1_O$ and $D2_O$ is sufficiently small. Even if this is not the case, the amount of delay may be known and controlled since the different routing paths appear within a relatively small area. In this case, delay element 660 may be used to delay Q2 by the same amount of delay created by inverter 670, multiplexer 675, and any additional wiring in the routing path. Thus, $D1_O$ can be made the inverse of $D2_O$ to within a sufficient tolerance required by differential standards.

In a single-ended mode, the data signal Q1, which is independent of data signal Q2, is selected by multiplexer 675 to send to SE driver 640. In an embodiment using delay element 660, the delay value may be changed or the delay element circumvented during a single-ended mode. Additionally, the added delay of delay element 660 may be tolerated as the two signals do not have to be synchronized. In either a single-ended mode or a differential mode, the data signals Q1 and Q2 may originate from any logic, and not necessarily an output register cell.

Figure 7:
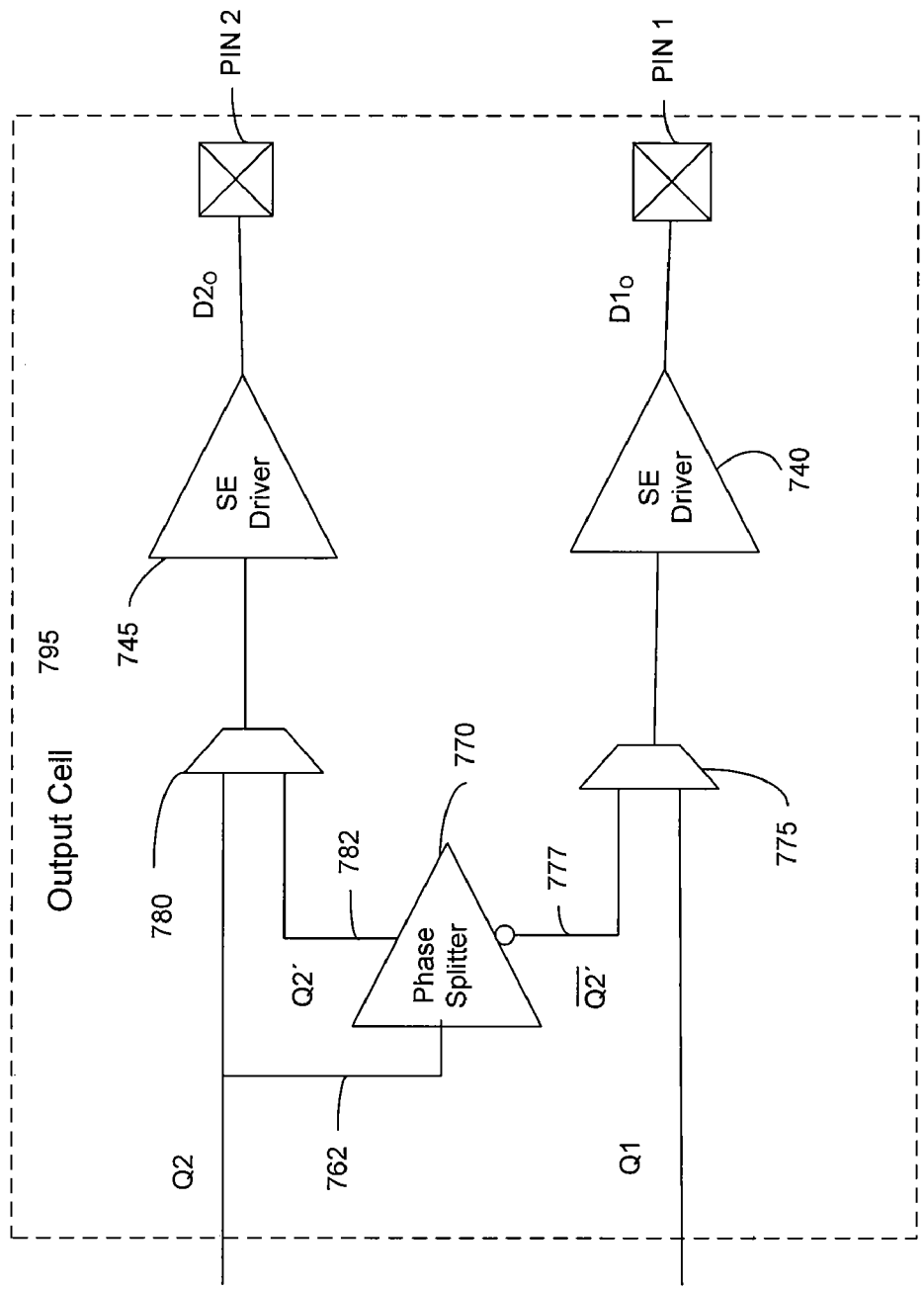
FIG. 7 is a schematic of an output cell used to output single-ended signals or differential signals according to another embodiment of the present invention.

FIG. 7 is a schematic of an output cell 795 used to output single-ended signals or differential signals according to another embodiment of the present invention. In a differential output mode, the data signal Q2 is sent along line 762 to phase splitter 770, which produces two signals that are the inverse of each other. A positive signal Q2' is produced on line 782 and the inverted signal $\overline{Q2'}$ is produced on line 777. A multiplexer 780 receives Q2' and selects Q2' to send to SE driver 745, which sends an output $D2_O$ to pin 2. A multiplexer 775 receives $\overline{Q2'}$ and selects $\overline{Q2'}$ to send to SE driver 740, which sends an output $D1_O$ to pin 1. In this manner the output paths of the differential signals can be controlled and made identical to within the tolerance required by differential IO standards.

In a single-ended mode, the data signal Q1, which is independent of data signal Q2, is selected by multiplexer 775 to send to SE driver 740. The data signal Q2 is selected by multiplexer 780 to send to SE driver 745. In either a single-ended mode or a differential mode, the data signals Q1 and Q2 may originate from any logic, and not necessarily an output register cell. An advantage of output cell 795 is that the paths to the respective output pins are symmetrical, which can reduce a mismatch due to voltage, temperature, and process variation such that each variation has a similar impact on a respective path.

Figure 8:
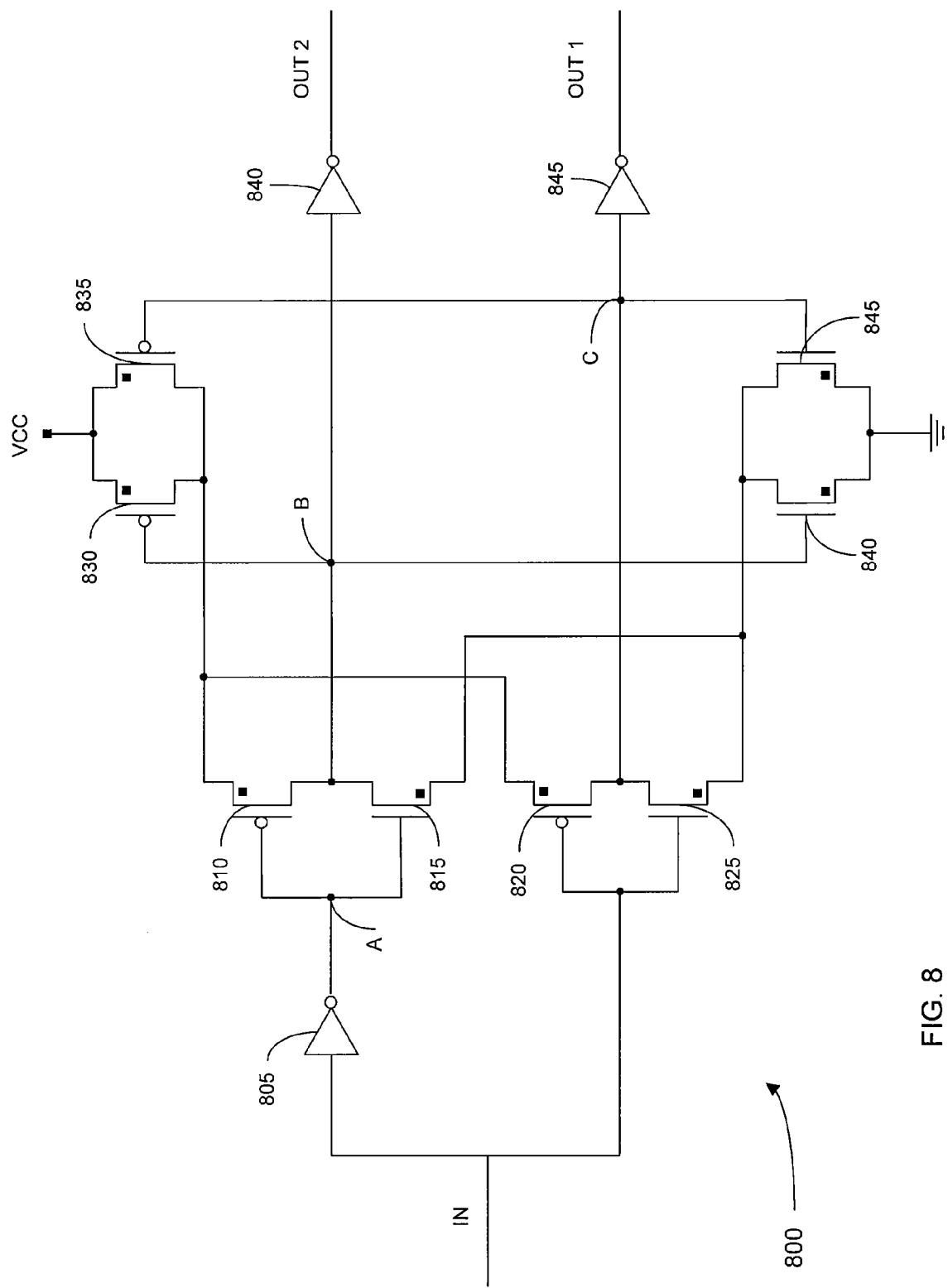
FIG. 8 is a schematic of a phase splitter according to an embodiment of the present invention.

FIG. 8 is a schematic of a phase splitter 800 according to an embodiment of the present invention. Phase splitter 800 receives one input signal IN and produces two output signals OUT 1 and OUT 2, which are inverses of each other. In one aspect, phase splitter 800 uses circuitry to ensure a low skew between OUT 1 and OUT 2.

The input IN controls a PMOS transistor 820 and an NMOS transistor 825 that drive the signal for node C. From node C, the signal then passes through an inverter 845 to form OUT 1. In input IN also travels through an inverter 805 before being used to control a PMOS transistor 810 and an NMOS transistor 815 that drive the signal for node B. From node B, the signal then passes through an inverter 840 to form OUT 2. One skilled in the art will recognize that different types of switching devices, such as transistors, may be used instead of the PMOS and NMOS devices shown.

As OUT 1 has one less inverter along its path than OUT 2, normally OUT 1 would switch first, e.g., from low to high. However, the circuit does not allow OUT 1 to go high until OUT 2 goes low. Thus, the outputs gate each other as the one that arrives first will not switch until the other one arrives.

As an illustration, if the initial state of IN is low, then nodes A and C are high and node B is low. The left NMOS 840 connected to ground is off, and the right NMOS 845 connected to ground is on. The left PMOS 830 connected to VCC is on, and the right PMOS 835 is off.

When signal IN goes from low to high, the PMOS 820 driving node C is turned off and NMOS 825 driving node C is turned on. The electric charge on node C starts to go to ground through the right NMOS 845, and voltage of node C starts to drop. However, when the voltage of node C drops to a certain level, the right NMOS 845 starts to turn off. The voltage of node C cannot drop any further until the voltage of node B goes up to a certain level to turn on the left NMOS 840. Therefore, node C cannot go to low until node B starts to go to high.

The same is true when IN goes from high to low. Initially node B is high and node C is low. Left PMOS 830 connected to VCC is off, while the right PMOS 835 connected to VCC is on. When the PMOS 820 driving node C is turned on, node C is pulled up by the right PMOS 835 to VCC. When the voltage of node C is high enough to turn off the right PMOS 835, the voltage of node C cannot rise any further until the voltage of node B is low enough to turn on the left PMOS 830. Thus, node B and node C have to switch at the same time.

Figure 9:
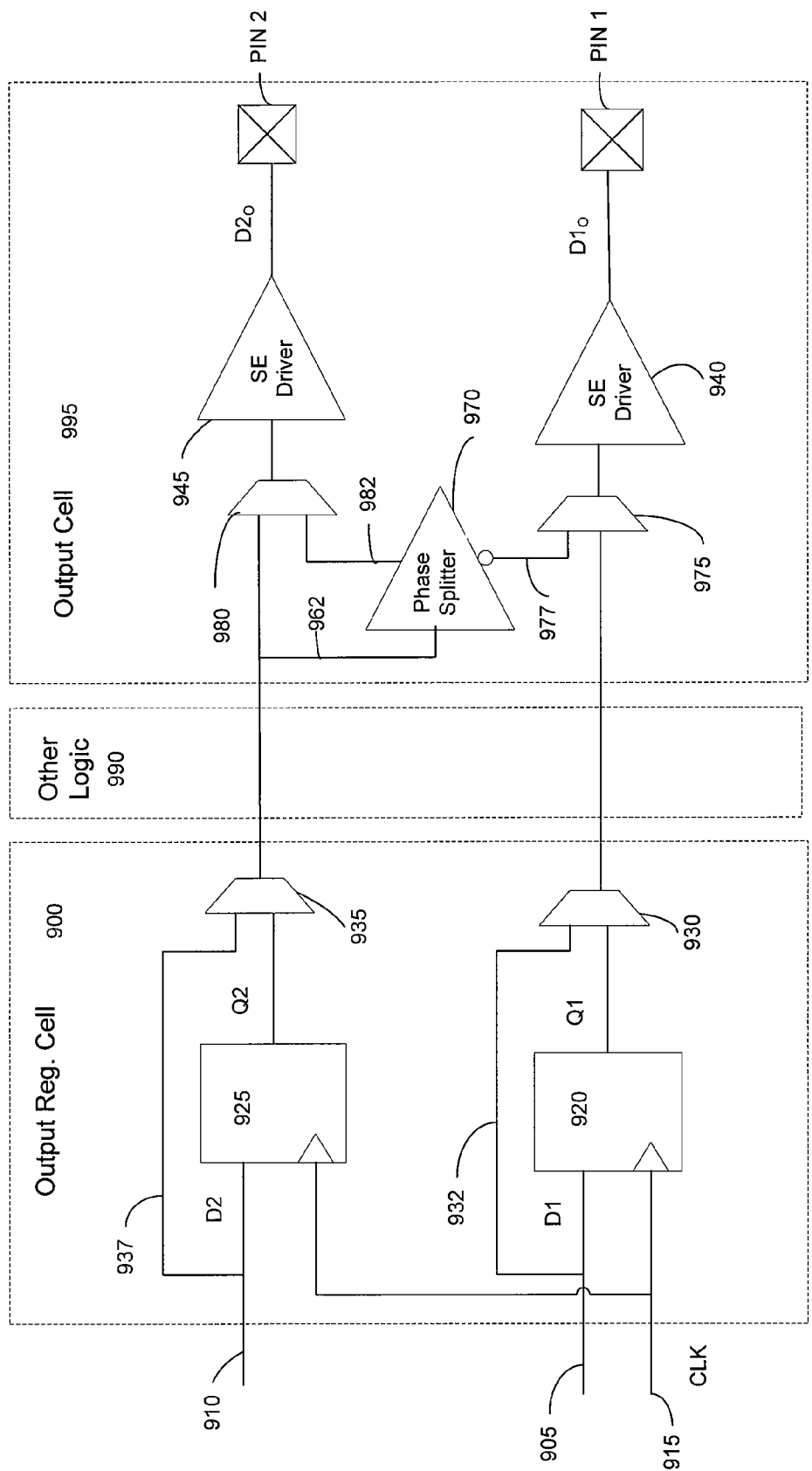
FIG. 9 is a schematic of output circuitry used to output single-ended signals or differential signals according to an embodiment of the present invention.

FIG. 9 is a schematic of output circuitry used to output single-ended signals or differential signals according to an embodiment of the present invention. This schematic includes an output register cell 900 that receives a data signal D1 on line 905. D1 may be timed by register 920 though a clock signal CLK on line 915. A data signal D2 is received by register 925 on line 910. When the PLD is configured to provide a differential output from an output cell 995, D1 and D2 may be the inverse of each other, unrelated, or only D2 may be received. When the PLD is configured to provide two single-ended outputs from output cell 995, D1 and D2 may independent of each other.

Both D1 and D2 may be timed by the CLK signal, or D2 may be timed by a different clock signal. As determined by the CLK signal, registers 920 and 925 respectively produce Q1 and Q2. Both D1 and D2 may bypass the registers 920 and 925 respectively on line 932 and line 937 as the output registers 920 and 925 may not need to be used for differential output since synchronization is provided in output cell 995. Multiplexer 930 selects between Q1 and the D1 signal on line 932. Multiplexer 935 selects between Q2 and the D2 signal on line 937. The outputs of multiplexers may travel through different paths via other logic 990 on their way to output cell 995.

In a differential output mode, the data signal from multiplexer 935 is connected with line 962 to phase splitter 970, which produces two signals that are the inverse of each other. A positive signal Q2' is produced on line 982 and the inverted signal $\overline{Q2'}$ is produced on line 977. A multiplexer 980 receives Q2' and selects Q2' to send to SE driver 945, which sends an output $D2_O$ to pin 2. A multiplexer 975 receives $\overline{Q2'}$ and selects $\overline{Q2'}$ to send to SE driver 940, which sends an output $D1_O$ to pin 1. In this manner the paths can be controlled and made identical to within the tolerance required by differential IO standards.

In a single-ended mode, the data signal from multiplexer 930, which is independent of data signal D2, is selected by multiplexer 975 to send to SE driver 940. The data signal from multiplexer 935 is selected by multiplexer 980 to send to SE driver 945.

One skilled in the art will appreciate alternative circuits in which embodiments of the invention encompass. Registers, such as 920 and 925, can be any general timing device that can be clocked, such as a latch, retiming circuit, flip-flop, storage element, or FIFO device. Also, the multiplexers shown can be any general selection circuit composed of, for example, logic gates, tristate gates, pass gates, or pass devices. Additionally, the connections shown may be direct connections or there may be intermediary circuit elements.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. An integrated circuit comprising:
   an output cell, the output cell including:
      a first selection circuit that has a first input coupled with a first data line and that has an output coupled with a first single-ended driver;
      a second selection circuit that has a first input coupled with a second data line and that has an output coupled with an input of the second single-ended driver;
      a phase splitter that has:
         an input coupled with the first data line;
         a first output coupled with a second input of the first selection circuit; and
         a second output coupled with a second input of the second selection circuit, wherein the first output transmits a first signal that is an inverse of a second signal transmitted from the second output;
      a first single-ended driver having an input coupled with an output of the first selection circuit and having an output coupled with a first output pin; and a second single-ended driver having an input coupled with an output of the second selection circuit and having an output coupled with a second output pin; and an output timing cell including:
a first timing device having an output coupled with the first input of the first selection circuit;
a second timing device having an output coupled with the first input of the second selection circuit;
a third data line coupled with an input of the first timing device;
a fourth data line coupled with an input of the second timing device;
a third selection circuit having:
a first input coupled with the output of the first timing device;
a second input coupled with the third data line; and
an output coupled with the first input of the first selection circuit; and
a fourth selection circuit having:
a first input coupled with the output of the second timing device;
a second input coupled with the fourth data line; and
an output coupled with the first input of the second selection circuit.

2. The integrated circuit of claim 1, further comprising:
a first set of other logic elements having an input coupled with the output of the first timing device; and
a second set of other logic elements having an input coupled with the output of the second timing device.

3. The integrated circuit of claim 1 wherein the second data line is used for a single-ended output.

4. The integrated circuit of claim 1 wherein a signal at the first output of the phase splitter is an inverse of a signal on the first data line.

5. The integrated circuit of claim 1 wherein the first selection circuit is directly connected to the first single-ended driver, and wherein the second selection circuit is directly connected to the second single-ended driver.

6. The integrated circuit of claim 1 wherein the first selection circuit is a multiplexer.

7. The integrated circuit of claim 1, wherein the output of the third selection circuit is directly connected to the first input of the first selection circuit, and wherein the output of the fourth selection circuit is directly connected to the first input of the second selection circuit.

8. The integrated circuit of claim 1, wherein during a differential output:
the first selection circuit is configured to select the signal at its second input to output; and
the second selection circuit is configured to select the signal at its second input to output.

9. The integrated circuit of claim 8, wherein during a single-ended output:
the first selection circuit is configured to select the signal at its first input to output; and
the second selection circuit is configured to select the signal at its first input to output.

10. A method of providing differential output, the method comprising:
receiving a first data signal at a first timing device;
outputting a second data signal from the first timing device based on a clock signal;
transmitting the second data signal to an output cell;
transmitting the second data signal to a phase splitter;
inverting the second data signal to provide a third data signal, wherein inverting the second data signal uses the phase splitter;
receiving, at a first single-ended driver that is coupled with a first output pin, a signal that is based on the second data signal and that is an inverse of the third data signal;
transmitting the third data signal to a first selection circuit;
selecting, with the first selection circuit, the third data signal to transmit to a second single-ended driver that is coupled with a second output pin;
outputting a fourth data signal from the phase splitter;
transmitting the fourth data signal to a second selection circuit; and
selecting, with the second selection circuit, the fourth data signal to provide the signal based on the second data signal that is received at the first single-ended driver.

11. The method of claim 10, further comprising:
preventing the third data signal from completing a transition from a low voltage to a high voltage before the fourth data signal starts a transition from a high voltage to a low voltage.

12. The method of claim 10 wherein the first selection circuit is directly connected to the second single-ended driver.

13. The method of claim 10 wherein the first timing device is a register.

14. The method of claim 10, further comprising receiving the second data signal at the first selection circuit.

15. The method of claim 10, further comprising receiving the second data signal at the second selection circuit.

16. An integrated circuit comprising:
an output cell, the output cell including
a first selection circuit that has a first input;
a second selection circuit that has a first input; and
a phase splitter having outputs respectively coupled to the first and second selection circuits; and
an output timing cell, the output timing cell including:
a first timing device having an output coupled with the first input of the first selection circuit;
a second timing device having an output coupled with the first input of the second selection circuit, wherein the phase splitter has an input coupled with the output of the first timing device or with the output of the second timing device;
a first data line coupled with an input of the first timing device;
a second data line coupled with an input of the second timing device;
a third selection circuit having:
a first input coupled with the output of the first timing device;
a second input coupled with the first data line; and
an output coupled with the first input of the first selection circuit; and
a fourth selection circuit having:
a first input coupled with the output of the second timing device;
a second input coupled with the second data line; and
an output coupled with the first input of the second selection circuit.

17. The integrated circuit of claim 16, wherein a first output of the phase splitter transmits a first signal that is an inverse of a second signal transmitted from a second output of the phase splitter.

18. The integrated circuit of claim 17, wherein the output cell further includes:

a first output driver having an input coupled with an output of the first selection circuit and having an output coupled with a first output pin; and a second output driver having an input coupled with an output of the second selection circuit and having an output coupled with a second output pin.

* * * * *